April 20, 1954 — D. C. PRINCE — 2,676,278
COOLING OF ROTATING ELECTRICAL MACHINERY
Filed Jan. 29, 1952 — 2 Sheets-Sheet 1
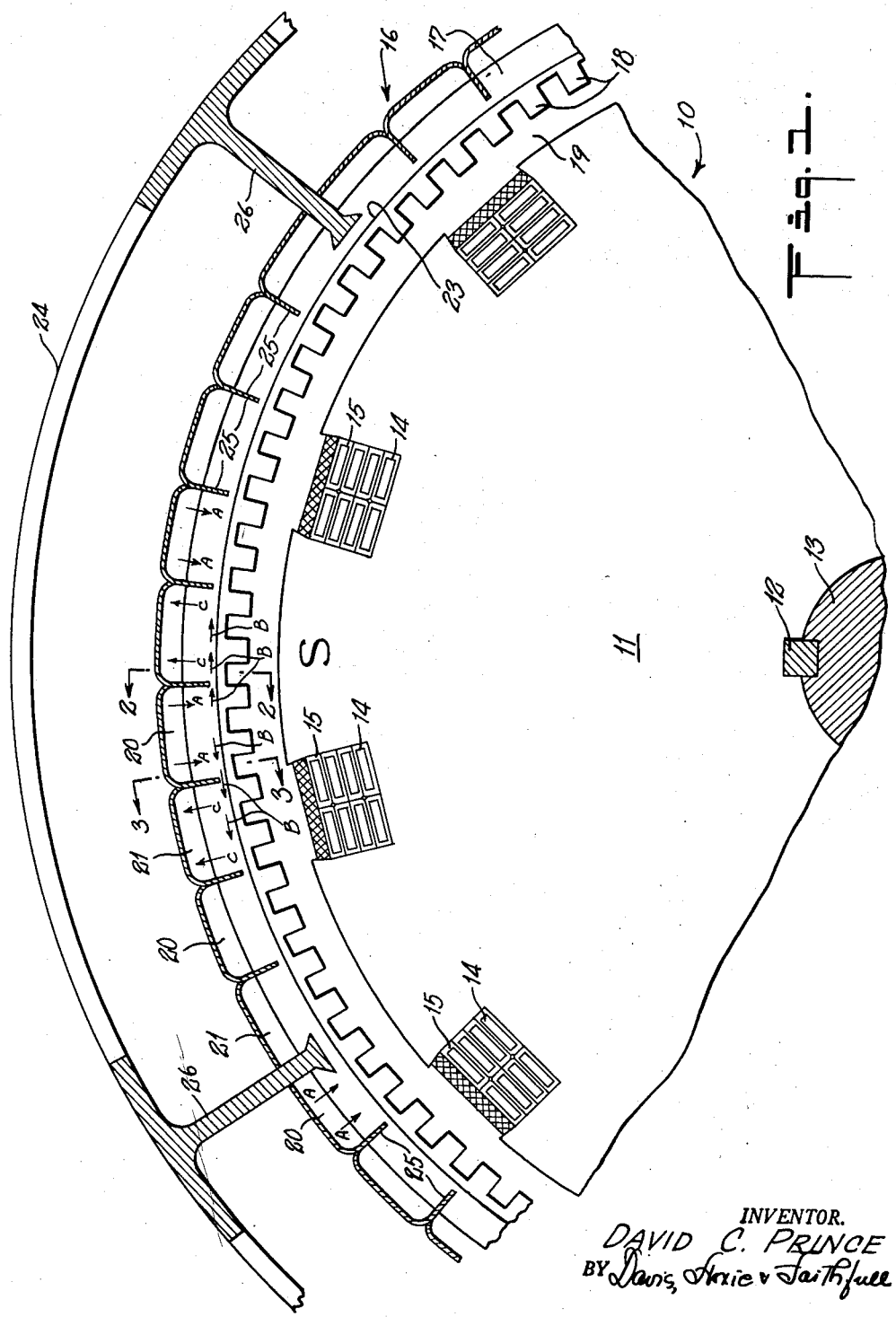
INVENTOR.
DAVID C. PRINCE
BY Davis, Hoxie & Faithfull
ATTORNEYS April 20, 1954      D. C. PRINCE      2,676,278
COOLING OF ROTATING ELECTRICAL MACHINERY
Filed Jan. 29, 1952      2 Sheets-Sheet 2
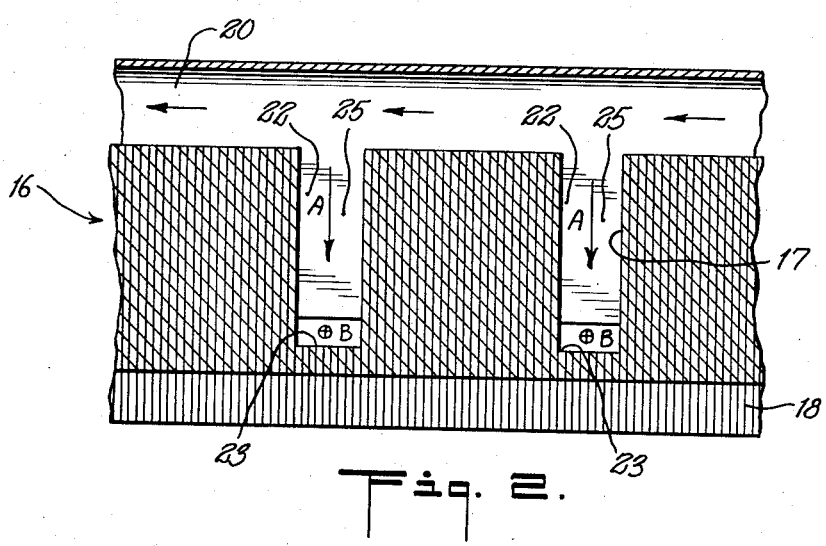
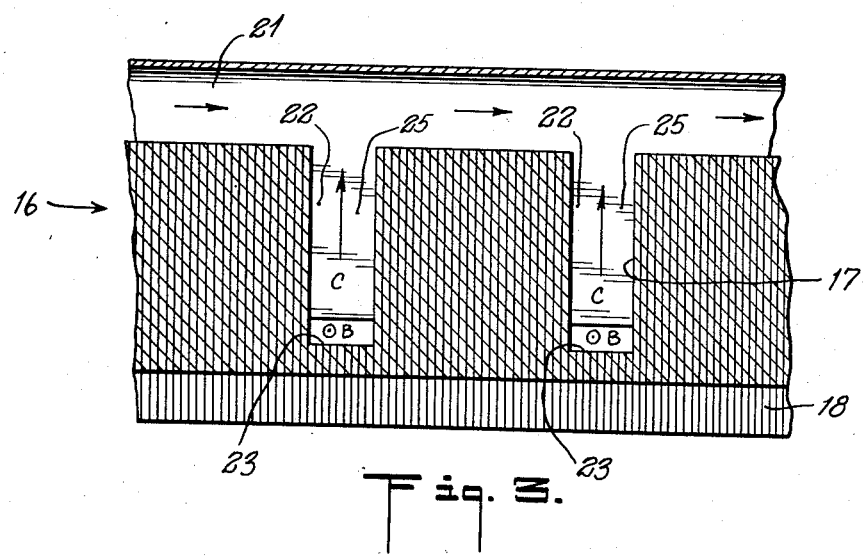
INVENTOR.
DAVID C. PRINCE
ATTORNEYS Patented Apr. 20, 1954

UNITED STATES PATENT OFFICE 2,676,278

2,676,278

COOLING OF ROTATING ELECTRICAL MACHINERY

David C. Prince, Schenectady, N. Y.

Application January 29, 1952, Serial No. 268,804

7 Claims. (Cl. 310—64)

This invention relates to rotating electrical machinery and particularly to cooling of the stator of such machinery.

The internal operating temperatures of modern electrical machines are quite high, and often it is necessary to resort to special measures for cooling purposes. For example, in high speed non-salient pole alternators of large capacity, forced ventilation is required. The volume of cooling air consumed is great, volumes in the order of about 70,000 to over 100,000 cubic feet per minute being rather common.

In general, the heat generated in rotating electrical machinery is removed by fans attached to the rotating parts of the machine, thereby promoting the general circulation of air. In the larger machines, the magnetic structure is sometimes divided by radial air ducts, or there may be axial ducts through which air is forced. In either case, the ducts interfere with the magnetic structure, and require a substantial increase in the size of the machine. These passages or ducts are of necessity severely limited in capacity and are exceedingly inefficient aerodynamically.

The present invention is directed to the provision of an improved electrical machine in which the stator is air-cooled efficiently by reason of its inclusion of a novel arrangement of ducts, without impairing the magnetic structure or substantially increasing the size of the machine. According to the invention, the stator-iron core is provided with inlet and outlet manifolds arranged alternately around the outer portion of the core, and extending longitudinally of the core. Annular slots are cut circumferentially in the core and extend inward from the periphery thereof. The slots are arranged in spaced relation longitudinally of the core, their outer portions opening into the manifolds. In each slot, partition members are positioned in alignment with the junctions of adjacent manifolds and extend generally radially of the stator axis and parallel thereto. These partitions are arranged across the width of the slots and terminate at their inner ends just short of the bottoms of the slots, to allow free passage of ventilating air. The bottoms of the slots extend around the stator axis and are located outside the bases of the stator teeth, that is, at a greater radius than these bases. In operation, ventilating air is forced into the inlet manifolds, the air then passing radially inward in the slots, through alternate spaces defined by the partitions, toward the air gap between the stator and the rotor. Continuing its passage, the cooling air turns circumferentially under the confining partitions and along the bottoms of the slots, then passes radially outward through the adjacent slot spaces defined by the partitions, and is finally discharged through the outlet manifolds.

A better understanding of my invention may be had from the following detailed description taken in conjunction with the accompanying drawings, in which:

Fig. 1 is a partial transverse section taken through the stator and rotor of a high speed non-salient pole alternator, to illustrate the principles of stator cooling in accordance with my invention;

Fig. 2 is a longitudinal sectional view taken along the line 2—2 of Fig. 1, and

Fig. 3 is a longitudinal sectional view taken along the line 3—3 of Fig. 1.

Referring now to Fig. 1 of the accompanying drawings, there is shown a high speed non-salient pole alternator. The rotor, shown generally at 10, consists of a solid cylinder 11 keyed by a key 12 to a shaft 13. On the periphery of the cylinder 11, a number of slots 14 are cut. The slots 14 extend longitudinally of the cylinder 11 and parallel to the axis of the shaft 13. The field windings 15 are wound in the slots 14.

The stator is shown generally at 16 and comprises a cylindrical iron core 17 surrounding the rotor 10 and having internal teeth 18 forming slots or grooves in which the armature conductors (not shown) are placed. The stator 16 and the rotor 10 define between them an air gap shown at 19.

Inlet and outlet manifolds 20 and 21, respectively, are disposed alternately around the periphery of the stator 16. These manifolds are trough shaped and are secured to the stator so that the bottoms of the troughs are spaced from the stator periphery by the sides of the troughs. The manifolds extend longitudinally of the stator 16 along its entire length, as will be seen in Figs. 2 and 3. In the iron core 17 a number of circumferential slots 22 are cut in planes normal to the rotor and stator axis. These slots, as will be seen in Figs. 2 and 3, form annular spaces positioned in spaced relation longitudinally of the stator 16. The slots 22 open at their outer portions into the troughs or manifolds 20 and 21. At their inner portions, the slots 22 have closed bottoms 23 located radially outward from the bases of the teeth 18 and the air gap 19. Each of the slots 22 contains a plurality of partitions 25 which cooperate with the inlet manifold 20 and outlet manifold 21 to confine the cooling air to a prescribed path in its passage through the stator 16. The partitions 25 extend across the width of slots 22, as best seen in Figs. 2 and 3, and extend radially of the stator and rotor axis and parallel thereto. At their inner ends, the partitions 25 terminate just short of the bottoms 23 of the slots so as to permit free passage of air around these inner ends.

The ends of the stator 16 may be secured to the frame casting 24 in any suitable manner, as by dovetailing 26. The dovetailed portions 26 of the frame may be fitted in the stator at regions where they can take the place of certain of the partitions 25, as illustrated in Fig. 1, or they may be located at the ends of the stator beyond these partitions. The rotor 11 may be mounted in the usual manner in the frame.

In the operation of the machine, the cooling air enters inlet manifolds 20 from either end thereof and flow radially inward through the slots 22 by way of the underlying alternate sub-divisions defined by the partitions 25, as shown by the arrows A. The air then moves under the inner ends of the confining partitions 25 circumferentially of the stator and into the adjacent slot sub-divisions underlying the outlet manifolds 21, as shown by the arrows B. It then flows radially outward, as shown at C, and exits at the outlet manifolds 21.

The present invention has the advantage that the air gap 19 is not used to conduct the cooling air for the stator. In the air gap, space for the magnetic material and for the coils is at a premium. In accordance with the present invention, no sacrifice at all need be made in this gap, as opposed to prior art designs where the air gap forms part of the cooling air passage for the stator. The air gap in the new machine may be made perfectly smooth, thus minimizing winding losses. The entire supply of air entering the machine in the conventional manner can then be utilized to cool the rotor. In some machines, particularly in synchronous machinery, rotor heating has been a limiting factor in their design. In prior systems, the ventilating air passing through the rotor, is discharged through the stator. The rate of heat dissipation depends, among other factors, upon the difference in temperature between the cooling air and the surface to be cooled, and so the stator is not very effectively cooled, since the air has already been heated during its passage through the rotor. The present invention provides a more efficient ventilation system, since the stator and rotor cooling systems are independent of each other, thus allowing each to function more effectively.

While a high speed, non-salient pole alternator has been used to illustrate the principles of my invention, it will be understood that the invention is applicable to all types of rotating electrical machinery, whether A. C. or D. C.

It will be understood that the inlet manifolds 20 may be connected at one end of the stator to a common pipe (not shown) for supplying the cooling air under pressure to these manifolds, and the outlet manifolds 21 may be connected at the other end of the stator to a common discharge pipe (not shown). The manifolds and the partitions 25 may be secured in position on the stator in any suitable manner, as by welding, bolting, etc. If desired, the partitions 25 may be made integral with the sides of the manifolds. While it is preferred that the manifolds 20 and 21 and the corresponding partitions 25 be arranged around the full 360° of the stator periphery, they may be arranged around only a selected part or parts of the periphery. Also, while I have described the rotor 10 as carrying the field windings, and the stator 16 as carrying the armature windings, it will be apparent that the reverse arrangement may be used.

I claim:

1. In a rotating electrical machine having a rotor and a surrounding cylindrical stator forming between them an air gap, the improvement which comprises air inlet and outlet manifolds at the outer periphery of the stator and disposed alternately at least partly around said periphery, the stator having generally radial slots opening at their outer portions into the manifolds, the inner portions of the slots terminating at closed bottoms located outward from the air gap, and generally radial partitions in each slot terminating at their inner ends short of said bottoms and dividing the slot into adjacent sub-divisions each underlying a manifold with which it communicates, alternate sub-divisions of the slots forming passages through which air flows radially inward from the inlet manifolds, whereby the inflowing air passes under said inner ends of the partitions and along the bottoms of the slots and then radially outward through the other sub-divisions to the outlet manifolds.

2. The improvement according to claim 1, in which said manifolds are trough-shaped and extend longitudinally of the stator, said slots extending circumferentially of the stator and being spaced along its length.

3. The improvement according to claim 1, in which said partitions extend generally parallel to the axis of the stator and transversely of the slots.

4. The improvement according to claim 1, in which said manifolds are trough-shaped and extend longitudinally of the stator, said slots extending circumferentially of the stator and being spaced along its length, the partitions extending generally parallel to the axis of the stator and transversely of the slots.

5. The improvement according to claim 1, in which the stator has internal teeth forming conductor grooves adjacent the air gap, said bottoms of the slots being located outward from the bases of said teeth.

6. The improvement according to claim 1, in which said partitions extend generally parallel to the manifolds and are joined to the manifolds at the junctions of adjacent manifolds.

7. A stator for rotating electrical machinery, comprising an annular iron core, air inlet and outlet manifolds at the outer periphery of the core and extending longitudinally of the core, the inlet and outlet manifolds being disposed alternately in closely adjacent relation at least partly around the core periphery, the core having in its outer periphery a series of circumferentially extending slots spaced lengthwise of the core and opening at their outer portions into the manifolds, the slots having closed bottoms at their inner portions, and generally radial partitions in each slot extending transversely thereof and parallel to the manifolds, the partitions being located approximately at the junctions of adjacent manifolds and dividing the slots into sub-divisions each underlying a manifold with which it communicates, the partitions terminating at their inner ends short of said bottoms, alternate sub-divisions of each slot forming passages through which air flows radially inward from the inlet manifolds, whereby the inflowing air passes under said inner ends of the partitions and along the bottoms of the slots and then radially outward through the other sub-divisions to the outlet manifolds.

References Cited in the file of this patent

UNITED STATES PATENTS

| Number | Name | Date |
| --- | --- | --- |
| 890,577 | Richards | June 9, 1908 |
| 1,792,720 | Williamson | Feb. 17, 1931 |
| 2,033,058 | Williamson | Mar. 3, 1936 |

FOREIGN PATENTS

| Number | Country | Date |
| --- | --- | --- |
| 318,671 | Great Britain | Sept. 9, 1929 |
| 497,492 | Great Britain | Dec. 21, 1938 |